United States Patent
Sakata (10) Patent No.: US 9,628,963 B2
(45) Date of Patent: *Apr. 18, 2017

(54) ONBOARD APPARATUS, COMMUNICATION SYSTEM AND COMMUNICATION METHOD

(71) Applicant: NEC Corporation, Tokyo (JP)

(72) Inventor: Masayuki Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,232

(22) Filed: Apr. 4, 2016

(65) Prior Publication Data

US 2016/0219417 A1    Jul. 28, 2016

Related U.S. Application Data

(63) Continuation of application No. 14/346,264, filed as application No. PCT/JP2012/069770 on Aug. 2, 2012, now Pat. No. 9,338,237.

(30) Foreign Application Priority Data

Sep. 22, 2011   (JP) .................................. 2011-207509

(51) Int. Cl.
*H04W 4/06* (2009.01)
*G08G 1/01* (2006.01)
(Continued)

(52) U.S. Cl.
CPC ............ *H04W 4/06* (2013.01); *G08G 1/0112* (2013.01); *G08G 1/0965* (2013.01); *H04L 67/12* (2013.01);
(Continued)

(58) Field of Classification Search
CPC ....... H04W 4/06; H04W 4/008; H04W 4/021; H04W 4/064; H04W 8/005; H04W 88/04
(Continued)

(56) References Cited

U.S. PATENT DOCUMENTS 7,139,589 B2 * 11/2006 Sawada ................ H04B 7/2606
                                                            370/328
7,272,357 B2   9/2007 Nishiga et al.
(Continued)

FOREIGN PATENT DOCUMENTS

JP    2001-358640 A    12/2001
JP    2003-036495 A    2/2003
(Continued)

OTHER PUBLICATIONS

ETRI, "Discussion paper on PBS section 5.6," 3GPP TSG-SA1 #44, S1-090074, San Antonio, Texas, 3 pages (Feb. 2-6, 2009).
(Continued)

*Primary Examiner* — Duc C Ho
(74) *Attorney, Agent, or Firm* — Wilmer Cutler Pickering Hale and Dorr LLP (57) ABSTRACT

An onboard apparatus according to the present invention is an onboard apparatus which is installed in each of a plurality of vehicles so as to perform communication between vehicles and communication with a wireless station, comprising: a receiver that receives from neighboring onboard apparatuses, surround information that indicates the presence of onboard apparatuses in a communication area communicable with the wireless station; and, a processor that, upon receiving communication data, transmits the communication data addressed to the wireless station in accordance with the surround information.

11 Claims, 4 Drawing Sheets

(51) Int. Cl.
*G08G 1/0965* (2006.01)
*H04W 4/02* (2009.01)
*H04L 29/08* (2006.01)
*H04W 4/00* (2009.01)
*H04W 4/04* (2009.01)
*H04W 8/00* (2009.01)
*H04W 88/04* (2009.01)

(52) U.S. Cl.
CPC ............ *H04W 4/008* (2013.01); *H04W 4/021* (2013.01); *H04W 4/046* (2013.01); *H04W 8/005* (2013.01); *G08G 1/0133* (2013.01); *G08G 1/0141* (2013.01); *H04W 88/04* (2013.01)

(58) Field of Classification Search
USPC ................. 370/351, 252, 328, 338; 455/11.1
See application file for complete search history.

(56) References Cited

U.S. PATENT DOCUMENTS

| | | | | |
|---|---|---|---|---|
| 7,609,174 | B2* | 10/2009 | Tengler | G08G 1/20 340/901 |
| 7,843,869 | B2* | 11/2010 | Ikawa | H04L 67/12 370/328 |
| 7,848,278 | B2 | 12/2010 | Chen et al. | |
| 2002/0035554 | A1 | 3/2002 | Katsuno | |
| 2005/0003844 | A1 | 1/2005 | Nishiga et al. | |
| 2008/0200121 | A1 | 8/2008 | Yamamoto | |
| 2009/0296680 | A1 | 12/2009 | Suzuki et al. | |
| 2010/0151838 | A1 | 6/2010 | Wormald et al. | |
| 2011/0310733 | A1 | 12/2011 | Tzamaloukas et al. | |
| 2013/0083679 | A1* | 4/2013 | Krishnaswamy | G08G 1/093 370/252 |

FOREIGN PATENT DOCUMENTS

| | | |
|---|---|---|
| JP | 2004-072268 A | 3/2004 |
| JP | 2006-166307 A | 6/2006 |
| JP | 2006-311282 A | 11/2006 |
| JP | 2007-110633 A | 4/2007 |
| JP | 2008-016990 A | 1/2008 |
| JP | 2008-205817 A | 9/2008 |
| JP | 2009-152700 A | 7/2009 |
| JP | 2009-212753 A | 9/2009 |
| JP | 2009-232065 A | 10/2009 |
| JP | 2010-028636 A | 2/2010 |

OTHER PUBLICATIONS

Extended European Search Report corresponding to European Application No. 12832941.4, dated Mar. 23, 2015, 9 pages.
International Search Report corresponding to PCT/JP2012/069770 dated Sep. 18, 2012 (3 pages).
Japanese Office Action issued by the Japan Patent Office for Application No. 2013-534636 dated May 19, 2015 (4 pages).
European Office Action issued by the European Patent Office for Application No. 12832941.4 dated Jul. 8, 2016 (6 pages).
Japanese Office Action issued by the Japan Patent Office for Application No. 2015-173738 dated Aug. 16, 2016 (5 pages).

* cited by examiner

Surround Information 141

| | Vehicle to Vehicle Communication | Vehicle to Road Communication | | | |
|---|---|---|---|---|---|
| | Communication Channel | Communication Scheme | Communication Status | Communication Scheme | Communication Status |
| Onboard Unit 100-1 | CH0/CH1 | LTE | × | WiMAX | ○ |
| Onboard Unit 100-2 | CH0 | LTE | ○ | - | - |
| Onboard Unit 100-3 | CH0/CH1 | LTE | ○ | WiMAX | × |

Fig.4

ONBOARD APPARATUS, COMMUNICATION SYSTEM AND COMMUNICATION METHOD

CROSS-REFERENCE TO RELATED APPLICATIONS

This application is a continuation of U.S. application Ser. No. 14/346,264 filed Mar. 20, 2014, which is a national stage application of International Application No. PCT/JP2012/069770 entitled "Onboard Apparatus, Communication System and Communication Method," filed on Aug. 2, 2012, which claims the benefit of the priority of Japanese patent application No. 2011-207509, filed on Sep. 22, 2011, the disclosures of each of which are hereby incorporated by reference in their entirety.

TECHNICAL FIELD

The present invention relates to an onboard apparatus, communication system and communication method, in particular, relates to an onboard apparatus, a communication system and a communication method for performing communication with a wireless station.

BACKGROUND ART

In ITS (Intelligent Transport System), vehicle to vehicle communication for exchanging information between vehicles by use of radio transmission has been investigated. In vehicle to vehicle communication, onboard apparatuses (which will be referred to hereinbelow as onboard units) each are installed in plural vehicles, and each performs communication with other onboard units residing within the communication area of the own unit.

Further, in ITS, multi-hop communication that enables data forwarding by way of multiple onboard units is also attempted. In multi-hop communication, in order for a source onboard unit to establish communication with a destination onboard unit residing beyond the communication area of the own onboard unit, onboard units that are present between the source onboard unit and the destination onboard unit successively forward communication data addressed to the destination onboard unit.

It has been also investigated that when the road on which a vehicle that has an installed onboard unit is travelling is congested, the onboard unit transmits traffic jam information on the current status of that traffic congestion, and the traffic jam information is notified to onboard units residing out of the congested section of the road. In this case, as a communication area communicable with onboard units, a roadside unit having a wider communication area than that of onboard units is used. Upon receiving the traffic jam information, the roadside unit transmits the traffic jam information all at once to all the onboard units residing within the communication area.

In Patent Document 1 (JP2008-205817A), an onboard unit that performs communication with a roadside unit and neighboring onboard units is disclosed. The onboard unit disclosed in Patent Document 1 is able to perform communication with a roadside unit by way of neighboring onboard units when the vehicle which has an installed onboard unit runs outside the communication area of the roadside unit. Accordingly, when the onboard unit described in Patent Document 1 transmits information which is addressed to the roadside unit in a situation where a vehicle which the onboard unit has been installed is travelling outside the communication area of the road side unit, the onboard unit transmits information to neighboring onboard units. Then, when a neighboring onboard unit that is communicating with the roadside unit (which will be referred to hereinbelow as a "communicating onboard unit") receives the information addressed to the roadside unit, the communicating onboard unit forwards the information addressed to the roadside unit, to the roadside unit.

RELATED ART DOCUMENTS

Patent Document

Patent Document 1: JP2008-205817A

SUMMARY OF THE INVENTION

Problems to be Solved by the Invention

However, in a situation where a vehicle that has an installed onboard unit described in Patent Document 1 runs outside the communication area of the roadside unit, there is a possibility that the onboard unit will transmit information addressed to the roadside unit, to neighboring onboard units even when there are no onboard units that can perform communication with the roadside unit. In this case, the information addressed to the roadside unit is not forwarded to the roadside unit, but is repeatedly forwarded to multiple onboard units, thus posing a problem of unnecessary data transmission taking place.

It is an object of the present invention to provide an onboard apparatus, a communication system and a communication method for resolving the above problem.

Means for Solving the Problems

An onboard apparatus of the present invention that is installed in each of a plurality of vehicles so as to perform communication between vehicles and communication with a wireless station includes: a receiving means that receives from neighboring onboard apparatuses of the own apparatus, surround information indicating the presence of intra-area onboard apparatuses in a communication area communicable with the wireless station; and, a processing means that, upon receiving communication data when its own apparatus is outside the communication area, controls transmission of the communication data addressed to the wireless station, in accordance with the surround information.

A communication system of the present invention is a communication system including a plurality of onboard apparatuses which are installed in each of a plurality of vehicles and a wireless station performing communication with the onboard apparatuses, wherein a predetermined onboard apparatus from among the plurality of onboard apparatuses transmits surround information that indicates the presence of an intra-area onboard apparatus in a communication area communicable with the wireless station, a specific onboard apparatus from among the plurality of onboard apparatuses includes: a receiving means for receiving the surround information from the predetermined onboard apparatus; and, a processing means that, upon receiving communication data when its own apparatus is outside the communication area, controls transmission of the communication data addressed to the wireless station, in accordance with the surround information, the wireless station transmits the communication data transmitted from the processing means to the onboard apparatus residing in the communication area, and the onboard apparatuses residing in the communication area receive the communication data from the specific onboard apparatus.

A communication method of the present invention is a communication method for an onboard apparatus which is installed in each of a plurality of vehicles so as to perform communication between vehicles and communication with a wireless station comprising: a reception step of receiving from neighboring onboard apparatuses of the own apparatus, surround information indicating the presence of intra-area onboard apparatuses in a communication area communicable with the wireless station; and, a processing step of, upon receiving communication data when its own apparatus is outside the communication area, controlling transmission of the communication data addressed to the wireless station, in accordance with the surround information.

A communication method of the present invention is a communication method for a communication system including a plurality of onboard apparatuses which are installed in each of a plurality of vehicles and a wireless station that performs communication with the onboard apparatuses comprising: a first transmitting step in which a predetermined onboard apparatus from among the plurality of onboard apparatuses transmits surround information that indicates the presence of an intra-area onboard apparatus in a communication area communicable with the wireless station; a first receiving step in which a specific onboard apparatus from among the plurality of onboard apparatuses receives the surround information from the predetermined onboard apparatus; a processing step in which the specific onboard apparatus, upon receiving communication data when its own apparatus is outside the communication area, controls transmission of the communication data addressed to the wireless station, in accordance with the surround information; a second transmitting step in which the wireless station transmits the communication data transmitted from the processing means to the onboard apparatuses residing in the communication area; and a second receiving step in which the onboard apparatuses residing in the communication area receive the communication data from the specific onboard apparatus.

Effect of the Invention

According to the present invention, it is possible to transmit communication data in accordance with the communication status of neighboring onboard apparatuses.

EXEMPLARY EMBODIMENTS

An exemplary embodiment of the present invention is next described with reference to the accompanying drawings.

Figure 1:
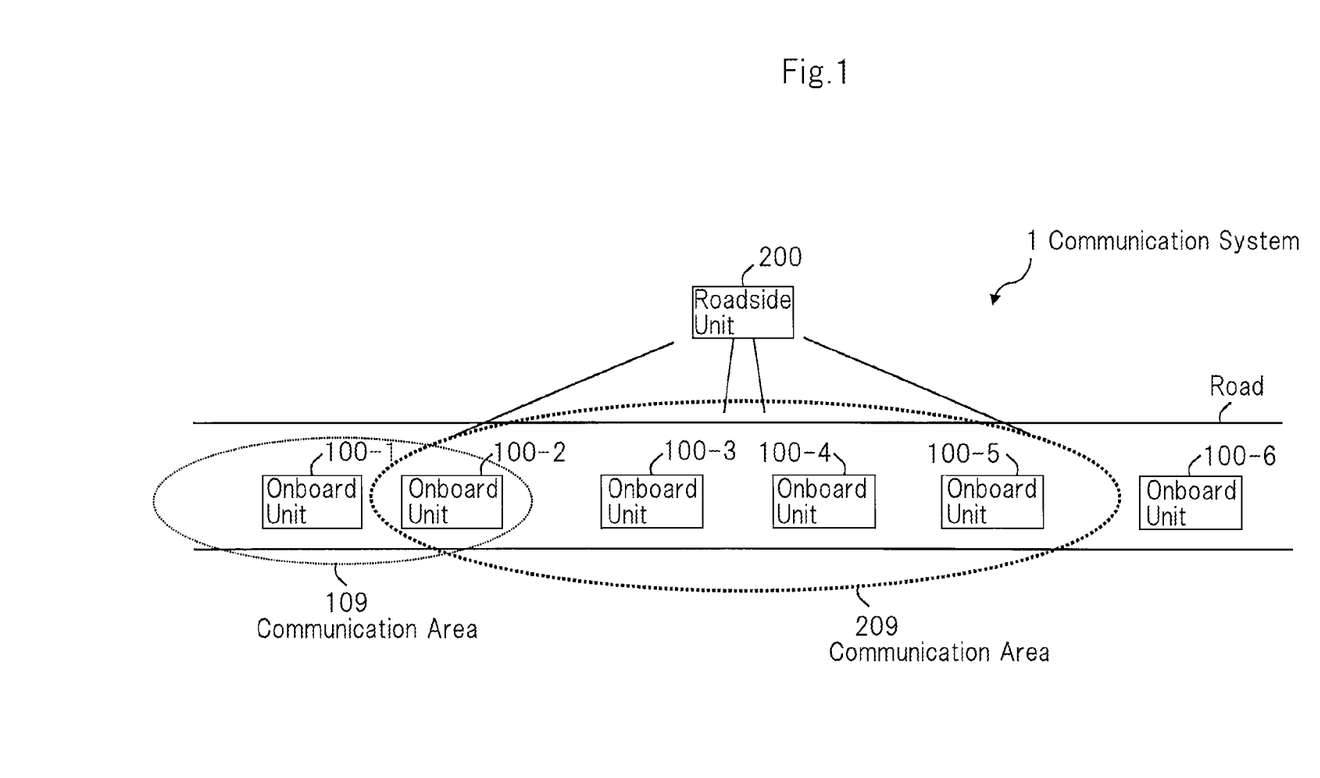
FIG. 1 A block diagram showing a configurational example of a communication system in an exemplary embodiment of the present invention.

FIG. 1 is a block diagram showing a configurational example of a communication system in the exemplary embodiment of the present invention.

Communication system 1 includes onboard units 100-1 to 100-6 and roadside unit 200.

Roadside unit 200 can be generally called a wireless station.

Roadside unit 200 is a communication apparatus that is installed on the side of a road, and has large communication area 209 that is wider than inter-vehicle communication area 109 that will be described later. Communication area 209 is a circular area having about a 10-km radius, for example.

Roadside unit 200 performs road to vehicle communication with onboard units residing within communication area 209 by use of, for example LTE (Long Term Evolution). For example, roadside unit 200 transmits communication data all at once to onboard units 100-2 to 100-5 installed in the vehicles travelling within communication area 209. Further, roadside unit 200 transmits an identification signal of a level receivable by the onboard units in communication area 209.

Onboard units 100-1 to 100-6 can be generally called onboard apparatuses.

Onboard units 100-1 to 100-6 have a plurality of communication media for transmitting communication data. Onboard units 100-1 to 100-6 are communication apparatuses installed in vehicles, and have a predetermined communication area in which vehicle to vehicle communication can be carried out by radio transmission. The predetermined communication area will be referred to hereinbelow as "inter-vehicle communication area" hereinbelow. The inter-vehicle communication area is a circular area of, for example, approximately a 1-km radius. For example, onboard unit 100-1 performs vehicle to vehicle communication with neighboring onboard unit 100-2, which resides within inter-vehicle communication area 109.

Onboard units 100-1 to 100-6 perform multi-hop communication. For example, onboard unit 100-1 transmits (forwards) communication data addressed to onboard unit 100-4, to neighboring onboard units. When onboard unit 100-2 residing within inter-vehicle communication area 109 of onboard unit 100-1 receives the communication data addressed to onboard unit 100-4, onboard unit 100-2 forwards the communication data to neighboring onboard units. Upon receiving the communication data addressed to onboard unit 100-4 from onboard unit 100-2, onboard unit 100-3 forwards the communication data to neighboring onboard units. Upon receiving the communication data addressed to its own unit from onboard unit 103, onboard unit 100-4 acquires the communication data.

Further, onboard units 100-1 to 100-6 perform road to vehicle communication with roadside unit 200 by use of communication media of their own unit. Onboard units 100-1 to 100-6 that are present between the source onboard unit and roadside unit 200 forward communication data addressed to roadside unit 200 by multi-hop communication. When an onboard unit inside communication area 209 receives the communication data addressed to roadside unit 200, the unit transmits the communication data to roadside unit 200.

For example, upon receiving communication data addressed to roadside unit 200 from onboard unit 100-1, onboard unit 100-2 transmits the communication data to roadside unit 200. Further, onboard units 100-1 to 100-6 receive communication data from roadside unit 200. For example, onboard units 100-1 to 100-6 will not forward the communication data from roadside unit 200.

Onboard units 100-1 to 100-6 transmit surround information including media information for identifying communication media and communication status information that denotes whether or not the communication media is available, for each of the communication media that have their own unit. In the present exemplary embodiment, onboard units 100-1 to 100-6 transmit to neighboring onboard units for every predetermined period, the surround information including media information for identifying the communication media based on the communication scheme with roadside unit 200 and communication status information that denotes whether or not that communication media is available for communication with roadside unit 200.

For example, upon receiving the identification signal of roadside unit 200, onboard units 100-1 to 100-6 determine whether or not their own unit is in a state ready to communicate with roadside unit 200 from the reception level of the identification signal (which will also be referred to hereinbelow as "connectable status"). That is, onboard units 100-1 to 100-6 determine whether or not the vehicle on which their own unit is installed is present inside communication area 209. Onboard units 100-1 to 100-6 create surround information that indicates that their own unit is in a state ready to communicate with roadside unit 200 and transmit the surround information to neighboring onboard units while the reception level of the identification signal of roadside unit 200 exceeds a predetermined reception threshold. Onboard units 100-1 to 100-6 receive surround information on each onboard unit from neighboring onboard units and acquire the surround information.

Figure 2:
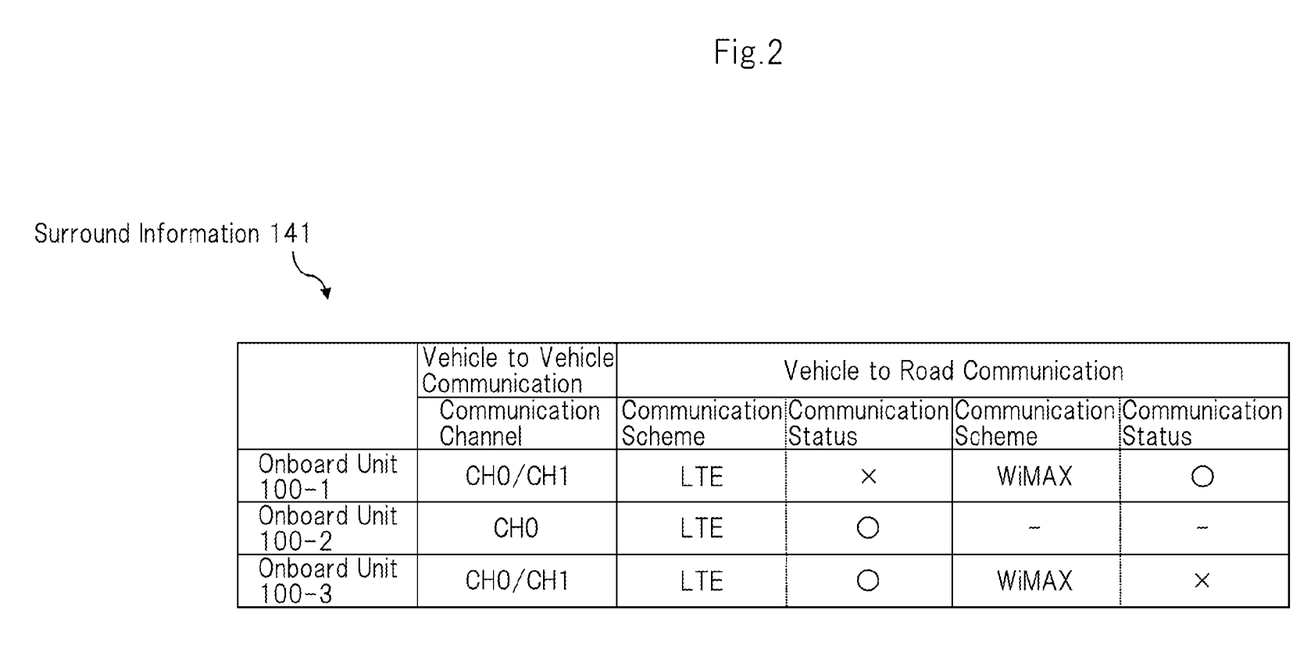
FIG. 2 A chart showing one example of surround information acquired by an onboard unit used in the communication system.

FIG. 2 is a chart showing one example of surround information acquired by onboard unit 100-2.

Surround information 141 shows communication channels for vehicle to vehicle communication, the communication scheme for road to vehicle communication and the communication status, for each of onboard units 100-1 to 100-3.

The channels for vehicle to vehicle communication denote communication channels available for the onboard unit. For example, upon the channels of onboard unit 100-1 two communication channels "CH0/CH1" are shown.

The communication scheme for road to vehicle communication denotes the communication scheme that the onboard unit can communicate with a roadside unit, i.e., the communication scheme of the communication media by which the onboard unit can communicate with a roadside unit. For example, for onboard unit 100-1, as the communication scheme with roadside unit 200, "LTE" is shown, whereas as communication scheme with another unillustrated roadside unit, "WiMAX" is shown.

The communication status shows whether or not the communication media can be used for communication with a roadside unit. Specifically, the communication status denotes whether or not the onboard unit is in a state ready for a roadside unit. "○" indicates a state in which the onboard unit can communicate with a roadside unit, and "x" indicates a state in which the onboard unit cannot communicate with a roadside unit. For example, the communication status in "LTE" of onboard unit 100-2 is shown with "○", so that onboard unit 100-2 is in a state connectable to roadside unit 200, hence can be called an intra-area onboard unit of roadside unit 200.

In FIG. 2, it is understood, for example that onboard unit 100-1 has "CH0" and "CH1" as communication channels for vehicle to vehicle communication, and has an LTE communication media that can communicate with roadside unit 200 and a WiMAX communication media that can communicate with another roadside unit. Further, onboard unit 100-1 is understood to be in a state incommunicable with roadside unit 200 and in a state communicable with the roadside unit in WiMAX.

On the other hand, onboard unit 100-2 has "CH0" alone as the communication channel for vehicle to vehicle communication, and has a communication media in LTE that is in a communicable state with roadside unit 200.

Onboard units 100-1 to 100-6 receive surround information including media information on the communication media that the neighboring onboard units use and communication status information on the communication media, and when the communication status information included in the surround information shows that communication with roadside unit 200 is in a ready state, the onboard units create select information that designates the media information that identifies the communication media communicable with the roadside unit 200 as the communication media to be used for forwarding communication data. Onboard units 100-1 to 100-6 transmit communication data together with the select information, to neighboring onboard units.

For example, when onboard unit 100-1 receives the surround information including media information for identifying communication media which onboard unit 100-2 can use for communication with roadside unit 200 and communication status information that denotes that the communication media is in a ready state, from neighboring onboard unit 100-2, onboard unit 100-1 creates select information that designates the communication media. Then, onboard unit 100-1, when transmitting multi-hop communication data addressed to onboard unit 100-6, transmits the select information together with the communication data addressed to onboard unit 100-6. When receiving the select information with the communication data addressed to onboard unit 100-6, onboard unit 100-2 forwards the communication data addressed to onboard unit 100-6 to roadside unit 200 by using the communication media designated by the select information.

Roadside unit 200, upon receiving the communication data addressed to onboard unit 100-6, transmits the data to onboard units 100-2 to 100-5 residing within communication area 209. Onboard unit 100-5, upon receiving the communication data addressed to onboard unit 100-6 from roadside unit 200, forwards the communication data addressed to onboard unit 100-6 to neighboring onboard units, and the communication data is received by onboard unit 100-6.

Next, the basic configuration of the onboard unit used in communication system 1 will be described.

Figure 3:
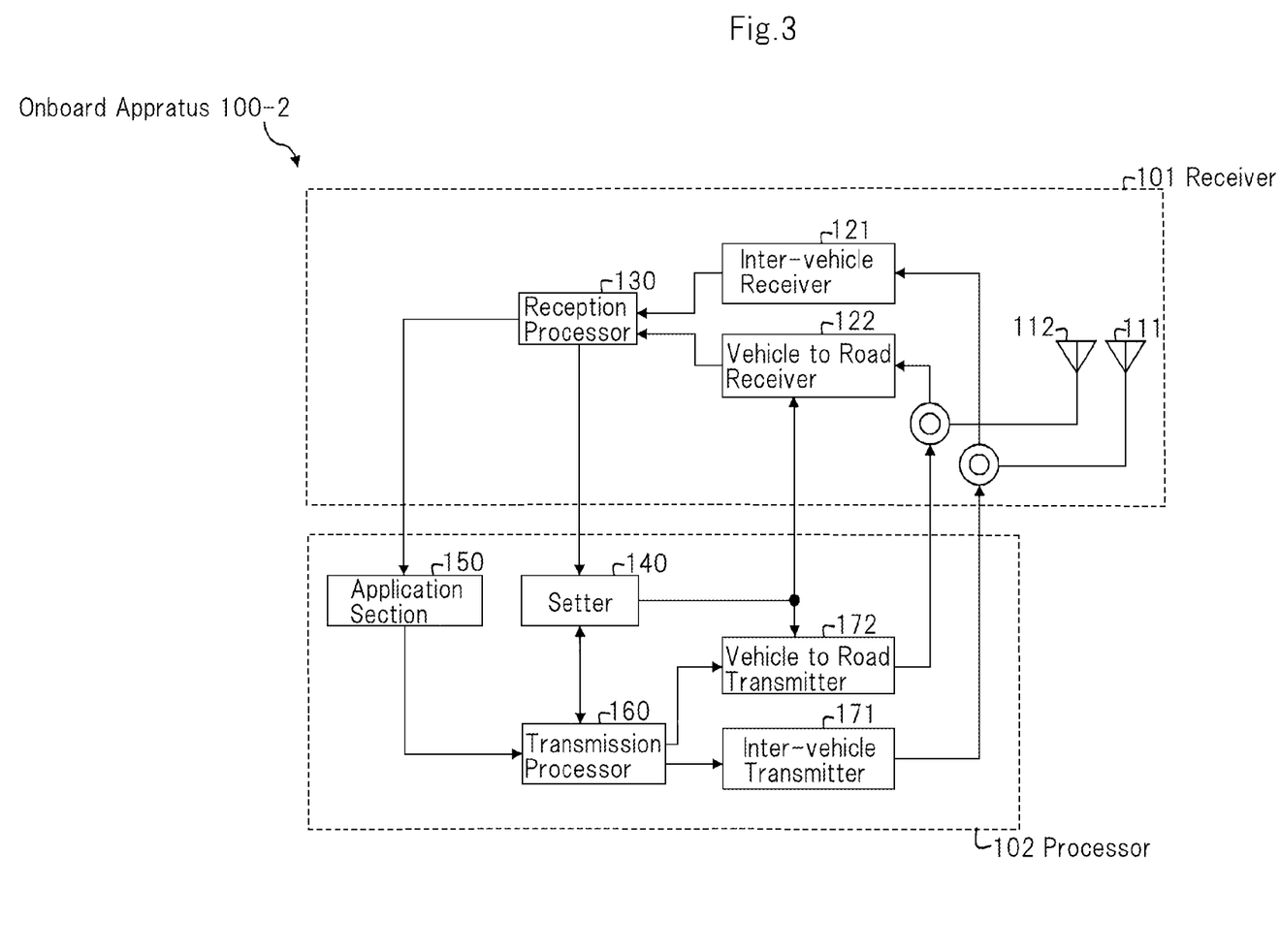
FIG. 3 A diagram showing a configurational example of an onboard unit.

FIG. 3 is a block diagram showing a basic configurational example of onboard unit 100-2 shown in FIG. 1.

Onboard unit 100-2 uses a plurality of communication media that have different communication area. Onboard unit 100-2 performs communication with communication apparatuses using a different communication scheme for each communication media. Onboard unit 100-2 includes a communicator (communication media) for vehicle to vehicle communication and a communicator (communication media) for road to vehicle communication. As the communication scheme of the communication media for road to vehicle communication, for example, LTE, WiMAX and others are used. Here, onboard unit 100-2 can be generally called an onboard unit, a predetermined onboard unit and specified onboard unit.

Onboard unit 100-2 includes receiver 101 and processor 102. Receiver 101 includes antennas 111 and 112, intervehicle receiver 121, vehicle to road receiver 122 and reception processor 130. Processor 102 includes setter 140, application section 150, transmission processor 160, inter-vehicle transmitter 171 and vehicle to road transmitter 172.

Herein, onboard units 100-1 to 100-6 shown in FIG. 1 have the same basic configuration. Inter-vehicle receiver 121 and inter-vehicle transmitter 171 form a communicator for vehicle to vehicle communication and vehicle to road receiver 122 and vehicle to road receiver 172 form a communicator for vehicle to road communication.

Receiver 101 can be generally called a receiving means.

Receiver 101 receives surround information that indicates the presence of onboard units in the communication area communicable with a roadside unit, from neighboring onboard units that are present in the inter-vehicle communication area of onboard unit 100-2. For example, receiver 101 receives from neighboring onboard units, surround information including media information for identifying communication media based on the communication scheme and communication status information that indicates whether or not the communication is in a state ready for use, for each of the media used by the neighboring onboard units.

In the present embodiment, receiver 101 receives from neighboring onboard units, the surround information that indicates the communication scheme with a roadside unit for each of the communication media communicable with the roadside unit, used by the neighboring onboard units, and whether or not the neighboring onboard units are in a state connectable to the roadside unit, i.e., the communication status that indicates whether or not a neighboring onboard unit is present within the communication area of the roadside unit.

Antenna 111 and antenna 112 are antennas for transmitting and receiving radio waves. Antenna 111 is used to perform vehicle to vehicle communication. Antenna 112 is used to perform road to vehicle communication.

Inter-vehicle receiver 121 receives radio signals transmitted from neighboring onboard units via antenna 111, and outputs the radio signals to reception processor 130.

Reception processor 130, upon receiving the radio signals from inter-vehicle receiver 121, extracts communication data addressed to onboard unit 100-2, communication data addressed to other onboard units and communication data addressed to the roadside unit and others, and supplies the communication data to application section 150.

Reception processor 130 extracts the surround information for each of neighboring onboard units, from the radio signals from inter-vehicle receiver 121 and records the extracted surround information on each onboard unit into setter 140. Stored in setter 140 is surround information 141 shown in FIG. 2, for example.

Processor 102 can be generally called a processing means.

Upon receiving communication data to be transmitted when its own onboard unit is residing out of the communication area of a roadside unit, processor 102 controls the communication data addressed to the roadside unit, in accordance with the surround information. Processor 102, upon receiving communication data, refers to the surround information, and transmits the communication data addressed to the roadside unit when an onboard unit that is in a state connectable to the roadside unit is present, whereas the processor 102 will not transmit the communication data addressed to the roadside unit to neighboring onboard units when an onboard unit that is in a state connectable to the roadside unit is not present.

For example, processor 102 receives traffic jam information on the status of traffic congestion of the road on which the vehicle is travelling, as communication data when the road is congested, then processor 102 refers to the surround information, and transmits the traffic jam information addressed to a roadside unit, to the neighboring onboard unit where there is a neighboring onboard unit that is in a state connectable to the roadside unit. On the other hand, when there is no neighboring onboard unit that is in a state connectable to a roadside unit, processor 102 will no transmit traffic jam information addressed to a roadside unit.

Alternatively, when receiving surround information including media information for identifying the communication media that is used for communication with a roadside unit and communication status information that denotes the communication media that can be used for communication with the roadside unit, processor 102 selects the media information of the communication media indicated by the communication status information as communication media to be used for forwarding communication data and creates the select information indicating the selected media information. Processor 102, upon receiving communication data for multi-hop, selects a communication media for which the number of communication status information is the greatest, from among a plurality of communication media (e.g., roadside units in LTE and WiMAX), and transmits the select information that designates the selected media as communication media for the next hop, together with the communication data, to neighboring onboard units.

Further, processor 102, upon receiving the forwarded, communication data addressed to the roadside unit, refers to the surround information. When an onboard unit that is in a state connectable to the roadside unit is present, the processor 102 forwards the communication data addressed to the roadside unit, to neighboring onboard units. On the other hand, processor 102 refers to the surround information, and will not forward the communication data addressed to the roadside unit when an onboard unit that is in a state connectable to the roadside unit is not present.

Further processor 102, upon receiving the forwarded, communication data addressed to the roadside unit, refers to the surround information. When onboard unit 100-2 itself is in a state connectable to the roadside unit, the processor 102 transmits the communication data to the roadside unit.

Application section 150 supplies communication data to be transmitted to transmission processor 160. Application section 150, upon receiving communication data addressed to another onboard unit and communication data addressed to the roadside unit from reception processor 130, supplies the communication data to transmission processor 160.

Application section 150, upon receiving communication data addressed to its own unit from reception processor 130, performs a predetermined process using the communication data. For example, when receiving communication data having a message that an emergency vehicle will pass by near its own vehicle, application section 150 displays the message indicated by that communication data on the display screen.

Further, when the road on which its own vehicle is travelling is congested, application section 150 supplies the traffic jam information showing the position of the its vehicle as communication data addressed to the roadside unit, to transmission processor 160. For example, onboard unit 100-2 includes a speed sensor for detecting the speed of its own vehicle and a position sensor for detecting the position of its own vehicle. When the speed detected by the speed sensor has been lower than a predetermined threshold for a predetermined period or longer, application section 150 supplies traffic jam information indicating the position detected by the position sensor, to transmission processor 160.

Transmission processor 160, upon receiving the communication data from application section 150, notifies the destination of the communication data to setter 140. Transmission processor 160 also supplies the communication data to inter-vehicle transmitter 171 and vehicle to road transmitter 172.

Transmission processor 160, upon receiving communication data addressed to another onboard unit or communication data addressed to the roadside unit, supplies the communication data to inter-vehicle transmitter 171.

Further, transmission processor 160 supplies the surround information stored in setter 140 as communication data addressed to another onboard unit to inter-vehicle transmitter 171 every predetermined period.

When receiving communication data addressed to another onboard unit or communication data addressed to the roadside unit, from transmission processor 160, inter-vehicle transmitter 171 transmits the communication data to neighboring onboard units via antenna 111.

Further, transmission processor 160, upon receiving communication data addressed to the roadside unit from application section 150, supplies the destination information that indicates the roadside unit to which the communication data is addressed. Also, transmission processor 160, upon receiving traffic jam information from application section 150, supplies the destination information that indicates the roadside unit to which the traffic jam information is addressed, to setter 140.

Moreover, transmission processor 160, upon receiving communication data for multihop, from application section 150, supplies the multihop information to setter 140.

Setter 140, upon receiving destination information from transmission processor 160, searches intra-area onboard units that are in a state connectable to the roadside unit indicated by the destination information from among the onboard units included in the surround information. When an intra-area onboard unit is present, and if the intra-area onboard unit is onboard unit 100-2 itself, setter 140 supplies execution information indicating execution of the communication process with the roadside unit to vehicle to road receiver 122 and vehicle to road transmitter 172. When the intra-area onboard unit is other than onboard unit 100-2, or when there is no intra-area onboard unit, setter 140 supplies stoppage information indicating stoppage of execution of the communication process with the roadside unit, to vehicle to road receiver 122 and vehicle to road transmitter 172.

When setter 140 receives multihop information from transmission processor 160 and when the communication status information on other than its own unit, included in the surround information indicates that the roadside unit is in a connectable state, setter 140 creates select information that selects the roadside unit as the communication media to be used for the next hop. Setter 140 supplies the select information to transmission processor 160. Transmission processor 160, upon receiving the select information from setter 140, supplies the select information together with the communication data for multihop to inter-vehicle transmitter 171. Inter-vehicle transmitter 171 transmits the select information together with the communication data for multihop from setter 140 to neighboring onboard units via antenna 111.

Vehicle to road transmitter 172, upon receiving the execution information from setter 140, executes a process to transmit communication data to the roadside unit. Upon receiving communication data addressed to the roadside unit from transmission processor 160 during the execution of the transmission process, vehicle to road transmitter 172 transmits the communication data to the roadside unit via antenna 112.

Vehicle to road transmitter 172, upon receiving stoppage information from setter 140, stops the process to transmit communication data to the roadside unit. Vehicle to road transmitter 172 will not transmit communication data during stoppage of the transmission process even when receiving communication data addressed to the roadside unit from transmission processor 160.

Further, vehicle to road receiver 122 accepts radio signals from antenna 112 to receive the identification signal of the roadside unit included in the radio signals, and supplies the reception level of the identification signal to reception processor 130.

Further, vehicle to road receiver 122 receives the execution information from setter 140, and executes the reception process of the communication data from the roadside unit. Vehicle to road receiver 122 receives the radio signals than other the identification signal sent from the roadside unit via antenna 112 during execution of the reception process, and outputs the radio signals to reception processor 130.

Reception processor 130 receives the radio signals from vehicle to road receiver 122, extracts communication data included in the radio signals, and supplies the communication data to application section 150. Application section 150, upon receiving the communication data, will not supply the communication data to transmission processor 160, for example. In other words, application section 150 will not forward the communication data transmitted from the roadside unit.

Further, reception processor 130 receives the reception level of the identification signal from vehicle to road receiver 122. When the reception level exceeds the reception threshold, reception processor 130 updates the surround information on onboard unit 100-2 in setter 140 so that the surround information indicates that the roadside unit identified by the identification signal is connectable. That is, reception processor 130 sets the communication status in LTE of onboard unit 100-2 shown in FIG. 2 with "○" when the reception level of identification signal exceeds the reception threshold.

Here, the present exemplary embodiment has been described by giving an example in which onboard unit 100-2 uses a single communication channel for vehicle to vehicle communication. However, two or more communication channels may be used for vehicle to vehicle communication. Moreover, the communicator for vehicle to road communication, configured by vehicle to road receiver 122 and vehicle to road transmitter 171 may be adapted to communicate with plural roadside units such as not only the roadside unit supporting LTE but also the roadside unit supporting WiMAX.

Figure 4:
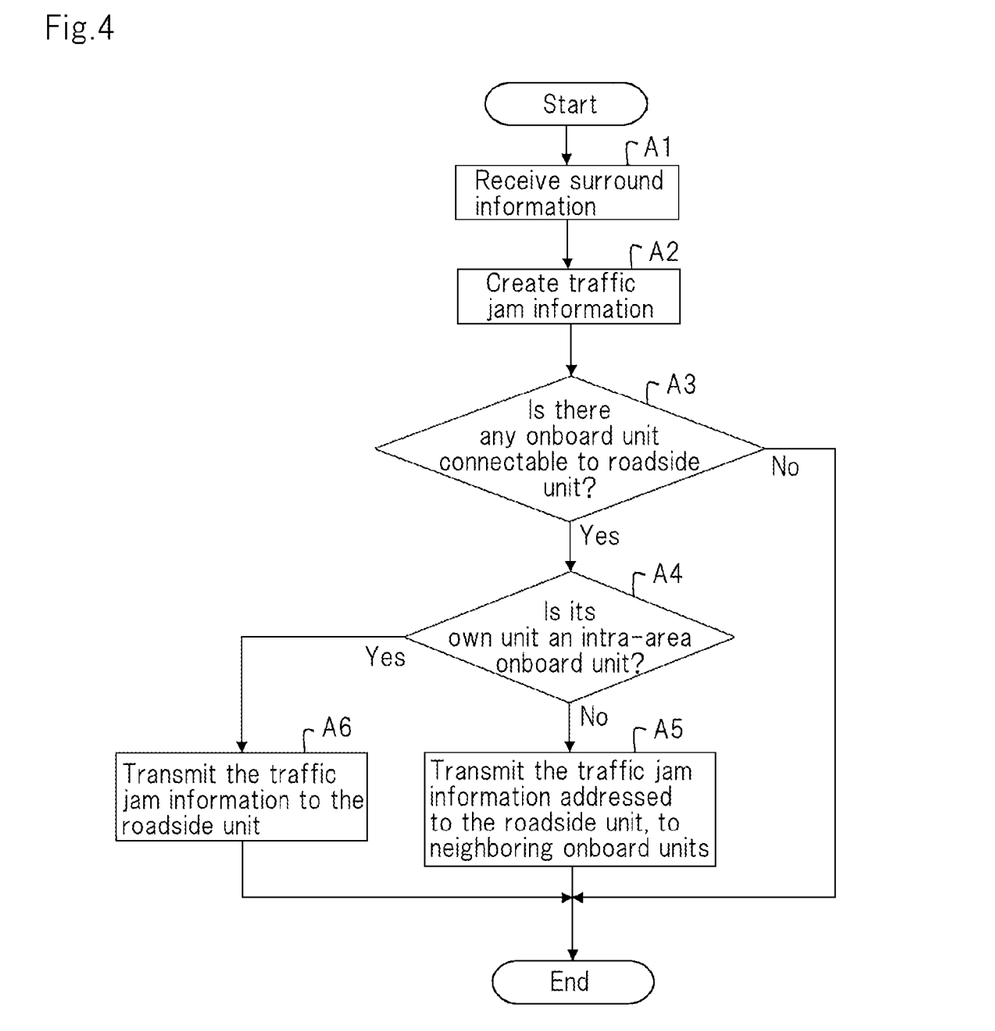
FIG. 4 A flow chart showing an example of processing steps of a communication method of an onboard unit.

FIG. 4 is a flow chart showing an example of processing steps of a communication method of onboard unit 100-1.

In FIG. 4, it is assumed that the road on which the vehicle installed in onboard unit 100-1 travels is congested.

To begin with, in onboard unit 100-1, receiver 101 receives from each of neighboring onboard units, surround information indicating the communication channels for vehicle to vehicle communication, the communication schemes of the communicators for vehicle to road communication and the reception status of each communicator (Step A1). Receiver 101 records the received surround information on each onboard unit into setter 140. Receiver 101 also records the surround information on onboard unit 100-1 itself, into setter 140.

Next, in onboard unit 100-1, since the road on which the vehicle installed in onboard unit 100-1 travels is congested, application section 150 creates traffic jam information addressed to roadside unit 200 (Step A2), and supplies the traffic jam information to transmission processor 160. Transmission processor 160 supplies the destination information indicating roadside unit 200 as the destination of the traffic jam information, to setter 140.

Setter 140, upon receiving the destination information from transmission processor 160, searches the surround information that indicates an intra-area onboard unit is in a state connectable to roadside unit 200 and that is provided by the destination information (Step A3). Then, when no surround information on an intra-area onboard unit is found, onboard unit setter 140 ends the process without transmitting the traffic jam information.

On the other hand, when surround information showing an intra-area onboard unit is present, setter 140 determines whether or not the intra-area onboard unit provided by the surround information is onboard unit 100-1 itself (Step A4). Then, when the intra-area onboard unit is onboard unit 100-1 itself, setter 140 supplies the execution information to vehicle to road transmitter 172 and also supplies transmission order information for the order of transmission to transmission processor 160. Transmission processor 160, upon receiving the transmission order information, supplies the traffic jam information addressed to roadside unit 200 to vehicle to road transmitter 172.

Vehicle to road transmitter 172, upon receiving the execution information from setter 140 and the traffic jam information from transmission processor 160, transmits the traffic jam information to roadside unit 200 via antenna 112 (Step A6).

Intra-area onboard unit provided by the surround information is an onboard unit other than onboard unit 100-1, setter 140 supplies stoppage information to vehicle to road transmitter 172 and supplies transmission order information to transmission processor 160. Transmission processor 160, upon receiving the transmission order information, supplies the traffic jam information addressed to roadside unit 200 to inter-vehicle transmitter 171.

Vehicle to road transmitter 172 receives the stoppage information from setter 140, and stops execution of the transmission process. When receiving the traffic jam information addressed to roadside unit 200 from transmission processor 160, inter-vehicle transmitter 171 transmits the traffic jam information to neighboring onboard units via antenna 111 (Step A5) and ends the process.

According to the present exemplary embodiment, the onboard unit is installed in each vehicles. In onboard unit 100-2 that can perform communication between vehicles and communication with roadside unit 200 as a wireless station, receiver 101 receives surround information indicating the presence of onboard units (intra-area onboard units) inside communication area 209 of roadside unit 200, from neighboring onboard units around its own unit. Processor 102, upon receiving communication data when its own unit is outside communication area 209, transmits the communication data addressed to roadside unit 200 in accordance with the surround information.

In general, the onboard unit transmits, in a situation where the vehicle with the own unit installed thereon travels outside the communication area of the roadside unit, the communication data addressed to the roadside unit is transmitted to neighboring onboard units even when there is no neighboring onboard unit that can communicate with the roadside unit.

In contrast to this, if the surround information indicating the presence of an onboard unit inside communication area 209 of roadside unit 200 is not received, onboard unit 100-2 determines that no neighboring onboard unit that can connect to roadside unit 200 is present around the own unit, and will not transmit communication data to roadside unit 200.

Accordingly, it is possible to avoid the communication data addressed to roadside unit 200 being repeatedly forwarded between multiple onboard units without reaching roadside unit 200, thereby reducing unnecessary data transmission between multiple onboard units.

Further, in the present exemplary embodiment, when receiving communication data, processor 102 refers to surround information, and if no onboard unit is present inside the communication area of the roadside unit, the processor stops transmission of the communication data addressed to roadside unit 200. When an onboard unit is present inside the communication area of the roadside unit, the processor transmits the communication data addressed to roadside unit 200.

Accordingly, when having received surround information indicating the presence of an onboard unit inside communication area 209 from a neighboring onboard unit, onboard unit 100-2 determines that its own unit is in a state connectable to roadside unit 200 via the neighboring onboard unit even if its own unit cannot directly communicate with roadside unit 200, and can transmit communication data addressed to roadside unit 200.

For example, in communication system 1 including roadside unit 200 having communication area 209 wider than the communication area of the onboard unit, when the road is congested, onboard unit 100-2 becomes able to transmit traffic jam information to roadside unit 200 if a neighboring onboard unit is in a state connectable to roadside unit 200. As result, communication system 1 can transmit the traffic jam information to the onboard units of vehicles travelling outside the congested section, all at once, and reduce congestion of communication data due to multihop communication.

Further, in the present exemplary embodiment, receiver 101 receives from neighboring onboard units, the surround information indicating the communication media that can be used for communication with roadside unit 200 from among the communication media that the neighboring onboard units use. Processor 102 transmits select information that designates the communication media provided by the surround information as the communication media to be used for forwarding of communication data, together with the forwarded communication data, to the neighboring onboard units.

For example, when transmitting communication data for multihop, onboard unit 100-2 can transmit the communication data together with the select information that designates roadside unit 200 to neighboring onboard units. Then, upon receiving the select information that designates roadside unit 200 together with the communication data, the neighboring onboard unit forwards the communication data to roadside unit 200, and roadside unit 200 further forwards the communication data to the onboard units inside the communication area of roadside unit 200.

Accordingly, when multihop communication is performed, onboard unit 100-2 can use not only vehicle to vehicle communication but also vehicle to road communication. As a result, it is possible to reduce the number of hops of communication data.

For example, when onboard unit 100-1 shown in FIG. 1 transmits communication data to onboard unit 100-6 by use of multihop communication, if the surround information transmitted from onboard unit 2 includes information on the communication media that can be used for communication with roadside unit 200, onboard unit 100-1 transmits the select information designating roadside unit 200 together with the transmitted communication data addressed to onboard unit 100-6. Upon receiving the select information and the communication data addressed to onboard unit 6, onboard unit 100-2 forwards (hops) the communication data addressed to onboard unit 100-6 to roadside unit 200. The communication data addressed to onboard unit 100-6 is forwarded from roadside unit 200 to onboard unit 100-5. Onboard unit 100-5 forwards the communication data to neighboring onboard unit 100-6 so that the communication data is acquired at onboard unit 100-6.

As a result, communication data can be transmitted from onboard unit 100-1 to onboard unit 100-6 by three hops, so that it is possible to reduce the number of hops compared to a case where multihop communication is performed using vehicle to vehicle communication only.

Further, in the present exemplary embodiment, when a neighboring onboard unit transmits communication data addressed to roadside unit 200, and when receiver 101 receives communication data from the neighboring onboard unit, processor 102 forwards the communication data. On the other hand, roadside unit 200 transmits communication data to all the onboard units that are present in communication area 209 at once. In each onboard unit in communication area 209, processor 102 will not forward the communication data received from roadside unit 200.

In general, in order to distribute communication data in a wide communication area by use of vehicle to vehicle communication, a large number of onboard units that are present in the wide communication area need to perform data forwarding, hence there is the risk that radio waves that are used in the communication system will interfere with each other.

In contrast to this, in communication system 1, roadside unit 200 transmits communication data all at once over wide communication area 209, so that it is possible to reduce the risk of interference of radio waves in communication system 1.

Here, the present exemplary embodiment has been described by giving an example in which the onboard unit transmits surround information that indicates its presence in the communication area of a roadside unit. However, surround information including the current position of the onboard unit may be transmitted. In this case, each onboard unit should include a position sensor that detects the position of its own vehicle, and processor 102 should create surround information indicating the communication scheme in which its own unit can communicate, and the communication status representing whether or not it is possible to communication with the roadside unit, and the position of its own vehicle that the position sensor has detected, and should transmit the surround information to neighboring onboard units. Then, each onboard unit acquires surround information by receiving surround information from neighboring onboard units. In this case, the onboard unit can know the positions of neighboring onboard units that can communicate with the roadside unit, hence can estimate the communication area of the roadside unit.

In the exemplary embodiment described above, the illustrated configuration is just an example, and the present invention should not be limited to the above configuration.

The present invention has been described with reference to the embodiments. However, it should be understood by those skilled in the art that the structure and details of the present invention may be changed in various manners without departing from the scope of the present invention.

The present application claims priority based on Japanese Patent Application No. 2011-207509 filed on Sep. 22, 2011, the entire content of which is incorporated herein by reference in its entirety.

The invention claimed is:

1. An onboard apparatus which is installed in each of a plurality of vehicles so as to perform communication between vehicles and communication with a wireless station, comprising:
    a receiver that receives from neighboring onboard apparatuses of said onboard apparatus, surround information that indicates the presence of intra-area onboard apparatuses in a communication area communicable with said wireless station; and,
    a processor that, upon receiving communication data when its own apparatus is outside said communication area, controls transmission of said communication data addressed to said wireless station, in accordance with said surround information.

2. The onboard apparatus according to claim 1, wherein said processor refers to said surround information when receiving said communication data, and transmits said communication data addressed to said wireless station when any of said onboard apparatuses is present, and will not transmit said communication data addressed to said wireless station when no intra-area onboard apparatus is present.

3. The onboard apparatus according to claim 1, wherein said receiver further receives, from said neighboring onboard apparatuses, said surround information that indicates a communication media that can be used for communication with said wireless station, from among communication media each onboard apparatus uses, and
    said processor transmits select information that designates said communication media indicated by said surround information as said communication media to be used for forwarding of said communication data, together with said forwarded communication data, to said onboard apparatus to which said surround information that indicates said communication media has been transmitted.

4. The onboard apparatus according to claim 1, wherein said wireless station has a wider communication area than said communication area within which communication between vehicles can be performed, and
    said processor transmits, to said neighboring onboard apparatuses, traffic jam information of a road on which said vehicle that has its own apparatus is travelling as said communication data addressed to said wireless station, to said neighboring onboard apparatuses.

5. The onboard apparatus according to claim 1, wherein said wireless station transmits communication data to all said onboard apparatuses present in said communication area, all at once,
    said neighboring onboard apparatuses transmit communication data addressed to said wireless station, and
    said processor, when said receiver receives communication data addressed to said wireless station, transmitted from said neighboring onboard apparatuses, forwards said communication data, and when said receiver receives communication data addressed to said wireless station, transmitted from said wireless station, will not forward said communication data.

6. A communication system including a plurality of onboard apparatuses which are installed in each of a plurality of vehicles and a wireless station that performs communication with said onboard apparatuses, wherein
　　a predetermined onboard apparatus from among said plurality of onboard apparatuses transmits surround information that indicates the presence of an intra-area onboard apparatus in a communication area communicable with said wireless station,
　　a specific onboard apparatus from among said plurality of onboard apparatuses includes:
　　a receiver that receives said surround information from said predetermined onboard apparatus; and,
　　a processor that, upon receiving communication data when its own apparatus is outside said communication area, controls transmission of said communication data addressed to said wireless station, in accordance with said surround information,
　　said wireless station transmits said communication data transmitted from said processor to said onboard apparatuses residing in said communication area, and,
　　said onboard apparatuses residing in said communication area receive said communication data from said specific onboard apparatus.

7. The communication system according to claim 6, wherein
　　said processor refers to said surround information when receiving said communication data, and transmits said communication data addressed to said wireless station when any of said intra-area onboard apparatuses is present, and will not transmit said communication data addressed to said wireless station when no intra-area onboard apparatus is present.

8. A communication method for an onboard apparatus which is installed in each of a plurality of vehicles so as to perform communication between vehicles and communication with a wireless station, comprising:
　　a reception step of receiving from neighboring onboard apparatuses of said onboard apparatus, surround information that indicates the presence of intra-area onboard apparatuses in a communication area communicable with said wireless station; and,
　　a processing step of, upon receiving communication data when its own apparatus is outside said communication area, controlling transmission of said communication data addressed to said wireless station, in accordance with said surround information.

9. The communication method according to claim 8, wherein in said processing step, reference to said surround information is made when said communication data is received, and said communication data addressed to said wireless station is transmitted when any of said intra-area onboard apparatuses is present, and said communication data addressed to said wireless station will not be transmitted when no intra-area onboard apparatus is present.

10. A communication method for a communication system including a plurality of onboard apparatuses which are installed in each of a plurality of vehicles and a wireless station performing communication with said onboard apparatuses, comprising:
　　a first transmitting step in which a predetermined onboard apparatus from among said plurality of onboard apparatuses transmits surround information that indicates the presence of an intra-area onboard apparatus in a communication area communicable with said wireless station;
　　a first receiving step in which a specific onboard apparatus from among said plurality of onboard apparatuses receives said surround information from said predetermined onboard apparatus;
　　a processing step in which said specific onboard apparatus, upon receiving communication data when its own apparatus is outside said communication area, controls transmission of said communication data addressed to said wireless station, in accordance with said surround information;
　　a second transmitting step in which said wireless station transmits said communication data transmitted from said specific onboard apparatus to said onboard apparatuses residing in said communication area; and,
　　a second receiving step in which said onboard apparatuses residing in said communication area receive said communication data from said specific onboard apparatus.

11. The communication method according to claim 10, wherein, in said processing step, reference to said surround information is made when receiving said communication data, and said communication data addressed to said wireless station is transmitted when any of said intra-area onboard apparatuses is present, and said communication data addressed to said wireless station will not be transmitted when no intra-area onboard apparatus is present.

* * * * *